(12) United States Patent
Wang et al.

(10) Patent No.: US 12,229,219 B2
(45) Date of Patent: Feb. 18, 2025

(54) DYNAMIC EVALUATION OF MODEL ACCEPTABILITY

(71) Applicant: International Business Machines Corporation, Armonk, NY (US)

(72) Inventors: Hui Wang, Beijing (CN); Zhao Yu Wang, Beijing (CN); Jing Wen Chen, Beijing (CN); Wei Song, Beijing (CN); Li Cao, Bei Jing (CN); Wan Yue Chen, Beijing (CN); Wen Zhong Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1028 days.

(21) Appl. No.: 17/165,993

(22) Filed: Feb. 3, 2021

(65) Prior Publication Data

US 2022/0245393 A1 Aug. 4, 2022

(51) Int. Cl.
*G06F 18/22* (2023.01)
*G06F 17/18* (2006.01)
*G06F 18/25* (2023.01)
*G06V 10/75* (2022.01)
*G06N 20/00* (2019.01)

(52) U.S. Cl.
CPC ............. *G06F 18/22* (2023.01); *G06F 17/18* (2013.01); *G06F 18/25* (2023.01); *G06V 10/751* (2022.01); *G06N 20/00* (2019.01)

(58) Field of Classification Search
CPC .......... G06F 18/22; G06F 17/18; G06F 18/25; G06F 18/217; G06V 10/751; G06N 20/00; G06N 3/044; G06N 3/08
See application file for complete search history.

(56) References Cited

U.S. PATENT DOCUMENTS

| | | |
|---|---|---|
| 2017/0124450 A1 | 5/2017 | Hara et al. |
| 2017/0372229 A1* | 12/2017 | Ura .......................... G06N 20/00 |
| 2020/0090070 A1 | 3/2020 | Bhattacharyya et al. |
| 2020/0097817 A1 | 3/2020 | Harris et al. |
| 2020/0104737 A1* | 4/2020 | Abaci ..................... G06N 20/00 |
| 2020/0241514 A1* | 7/2020 | Sun ........................... G06N 3/10 |
| 2021/0161402 A1* | 6/2021 | Euliano ................. A61B 5/4875 |

* cited by examiner

*Primary Examiner* — Hope C Sheffield
(74) *Attorney, Agent, or Firm* — CANTOR COLBURN LLP; Edward Wixted

(57) ABSTRACT

Aspects of the invention include generating a plurality of predictions that each define a plurality of future inputs for a model. A deviation curve is generated by determining a distance between each prediction of the plurality of predictions and a respective known data point of a plurality of known data points. One or more points in the deviation curve are sampled and the sampled points are compared to a low threshold and a high threshold. A judgement is determined for each prediction to determine whether the respective prediction will be accepted or denied as an input to the model. The future inputs for the model are modified based on the judgments.

12 Claims, 10 Drawing Sheets

DYNAMIC EVALUATION OF MODEL ACCEPTABILITY

BACKGROUND

The present invention generally relates to computer systems, and more specifically, to computer systems, computer-implemented methods, and computer program products to dynamically evaluate the acceptability of a model.

As the development of information and machine learning technology accelerates, the pool of applications that require an ever-increasing amount of real-time data to meet just-in-time computing requirements is increasing. As a result, such real-time computing efforts are consuming more and more central processing unit (CPU) resources, especially as the need for faster data delivery increases. This trend is expected to continue well into the future.

Failing to meet just-in-time computing requirements can have an immediate and lasting negative impact on the underlying business. For example, a chemical manufacturer that fails to catch an out-of-spec precursor component in real-time prior to downstream mixing may be forced to discard the spoiled product. To address these issues, various artificial intelligence (AI) based models have been proposed that attempt to mitigate otherwise demanding computing and timing requirements by predicting the value of the real-time data prior to that data being available. In essence, the predicted data can serve as a temporary stand-in for the real data when that data is not available in time (e.g., before the time period in which a decision must be made).

SUMMARY

Embodiments of the present invention are directed to dynamically evaluating a model's acceptance. A non-limiting example method includes generating a plurality of predictions that each define a plurality of future inputs for the model. A deviation curve can be generated by determining a distance between each prediction of the plurality of predictions and a respective known data point of a plurality of known data points. One or more points in the deviation curve are sampled and the sampled points are compared to a low threshold and a high threshold. A judgement is determined for each prediction to determine whether the respective prediction will be accepted or denied as an input to the model. The future inputs for the model are modified based on the judgments Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
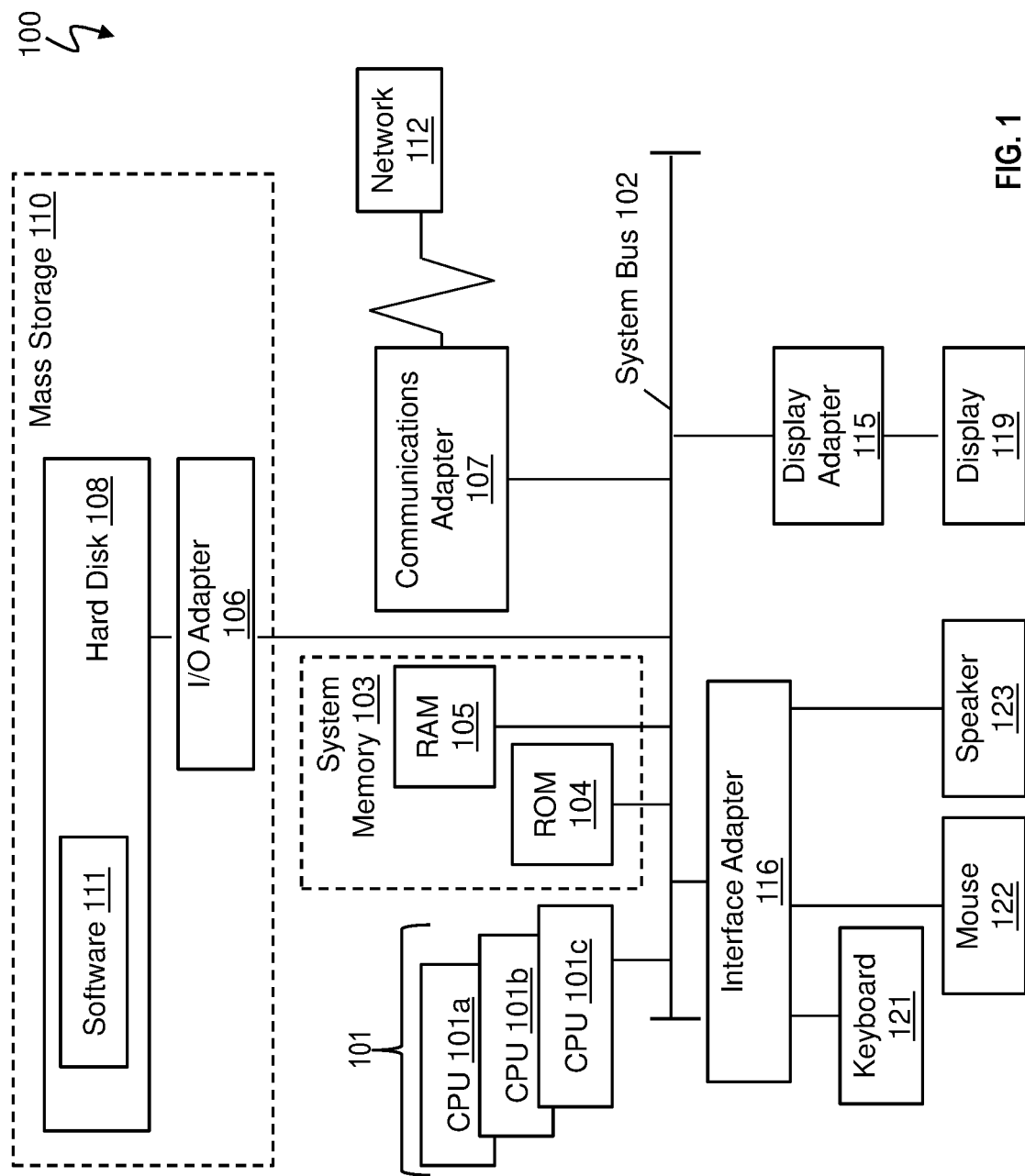
FIG. 1 depicts a block diagram of an example computer system for use in conjunction with one or more embodiments of the present invention.

The effective prediction of real-time data values is integral to the success of any simple or complex system requiring real-time data feeds, especially when the evaluation of the real-time data is computationally difficult and the likelihood of meeting the real-time data demand is low, intermittent, or subject to forced delays (e.g., data release schedules, etc.). While specialized models have been explored to provide prediction data as a temporary stand-in for the real data when that data is not available in time, current techniques are somewhat inflexible. For example, currently available artificial intelligence (AI) models do not provide a mechanism for dynamically evaluating the accuracy of the predictions. In effect, systems relying on these AI models are forced to accept the AI predictions for the real-time data even if the prediction accuracy slips. Prediction accuracy can decrease due to factors outside the control of the AI model, for example, a pressure or temperature spike due to mechanical failure of a valve in a manufacturing plant. Failing to account for these types of accuracy drops in the AI model can result in the same type of immediate and lasting negative impacts on the underlying business as failing to provide a prediction for the data in the first place.

One or more embodiments of the present invention address one or more of the above-described shortcomings by providing computer-implemented methods, computing systems, and computer program products configured to perform a dynamic evaluation of the acceptability of a model. In some embodiments, a judgement mechanism is introduced into the system to help users evaluate an AI model's acceptability. The acceptability of the model can change over time (acceptable, not acceptable, marginal), and different actions regarding the use of the model's predictions (accept, deny, recheck) can be taken in real-time according to the result of the model's acceptability check.

Embodiments of the present invention describe a new kind of approach for leveraging AI model generated real-time data predictions—one that inserts a judgment based on the dynamic sampling of actual data and a comparison of that dynamically sampled data to the predicted data. The system can calculate the deviation (e.g., gap, difference, distance, etc.) between the predicted data and the actual data of the sampling results, and, according to the value of the deviation, different downstream processes can be selected. Downstream processes can include, for example, accepting the result, denying the result, and requesting a recheck of the result. In some embodiments, the deviations are monitored over time, and together define a deviation curve having a resolution based on the sampling interval of the deviation checks. In some embodiments, the sampling interval itself can be dynamically adjusted according to calculated changes in a gradient (slope) at a sampling point in the deviation curve. For example, a large gradient can indicate an acceleration or deceleration of the gap at a future sampling point. This gradient data can be leveraged to make improved judgments (e.g., denying a prediction that would otherwise be acceptable because the gradient at that sampling point indicates that the gap is accelerating).

Advantageously, a prediction system modified with a judgment mechanism in this manner offers several technical solutions over conventional AI-based prediction models. As an initial matter, the insertion of a judgment unit allows the system to partially accept model predictions even when those models cannot always meet an accuracy requirement. Conventional models which lose prediction accuracy are typically discarded, even when those models can still make some accurate predictions. In other words, the present approach allows for the partial use of models which are otherwise permanently or temporarily unusable. Moreover, a model modified according to one or more embodiments can more naturally balance resource costs and overall accuracy, as the "gap" required for making decisions (accept, deny, recheck) can be manually or dynamically adjusted to increase or decrease, as desired, the required "fit" between the prediction and the actual data. Another technical benefit is a general reduction in the compute time itself due to the incorporation of dynamic sampling (described previously) and the use of pre-check module prior to performing the entire data comparison. In short, the pre-check module can find the top "x" deviations and can evaluate those in order of their respective weights/importance. This allows for low (or lower) priority deviations to be evaluated later (or not at all) depending on the timing requirements. This is especially useful for those business scenarios that strictly require a low delay time for real-time data but cannot conventionally achieve these timing requirements due to the actual compute time necessary to make the predictions (i.e., the compute time is longer than the time window required for real-time data).

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 9 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
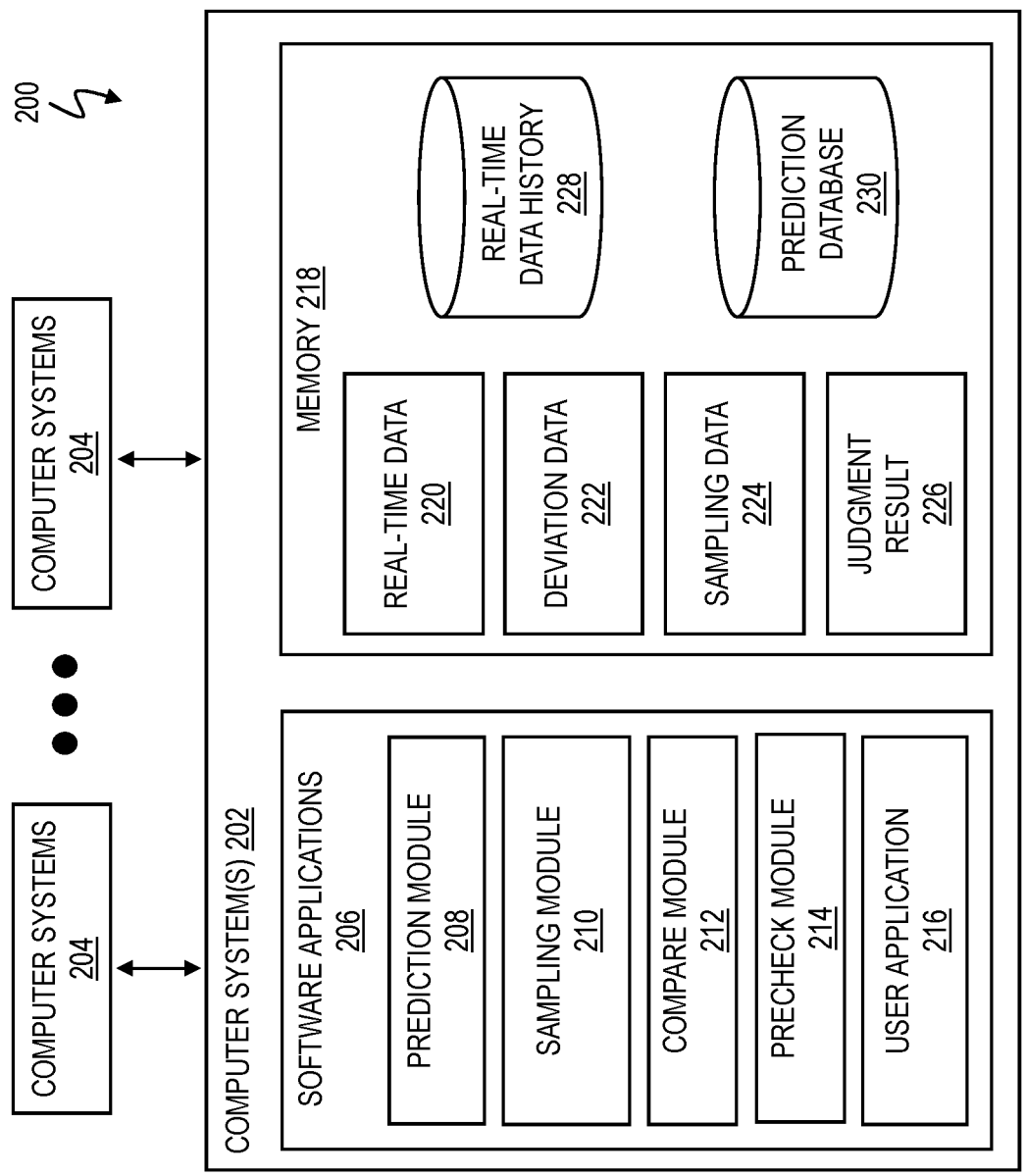
FIG. 2 is a block diagram of a system for evaluating model acceptability in accordance with one or more embodiments of the present invention.

FIG. 2 is a block diagram of a system 200 for dynamically evaluating a model's acceptance in accordance with one or more embodiments of the present invention. FIG. 2 depicts one or more computer systems 202 coupled to one or more computer systems 204 via a wired and/or wireless network. For example, computer system 202 can be representative of one or more cloud-based resources (e.g. remote computers, etc.) and computer systems 204 can be representative of numerous client (local) computers. One or more of the computer systems 202 can be configured to evaluate a model's acceptability at the request of the computer systems 204. Elements of the computer system 100 of FIG. 1 may be used in and/or integrated into computer systems 202 and computer systems 204. In some embodiments of the invention, computation is done direct at the local level. In other words, elements of the computer system 202 can instead (or in addition) be elements of the computer systems 204.

One or more software applications 206 can include a prediction module 208, a sampling module 210, a compare module 212, a precheck module 214, and a user application 216. The software applications 206 may utilize and/or be implemented as software 111 executed on one or more processors 101, as discussed in FIG. 1.

Figure 3:
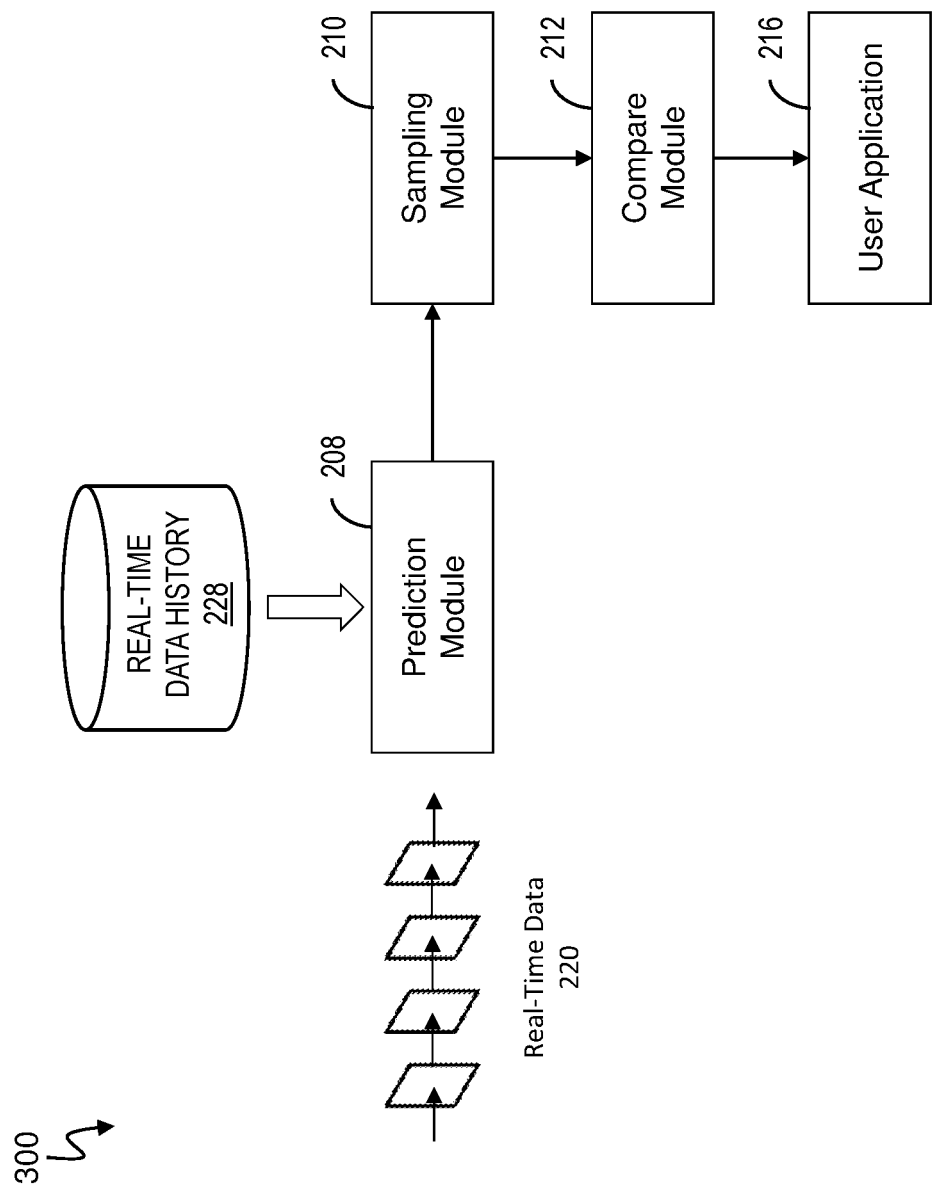
FIG. 3 is a block diagram of a dataflow for evaluating model acceptability in accordance with one or more embodiments of the present invention.

Memory 218 of the computer systems 202 can store, for example, real-time data 220 (e.g., a real-time data stream), deviation data 222, sampling data 224, and a judgment result output 226. A dataflow 300 of FIG. 3 illustrates interactions between various components of the software applications 206 and memory 218 of FIG. 2 for dynamically evaluating the acceptability of a model's prediction(s).

In some embodiments of the invention, the prediction module 208 is configured to receive real-time data 220. The real-time data 220 can be provided by an external source, such as an external data feed, or can be retrieved from a preconfigured resource, such as a database (e.g., real-time data repository 228). In some embodiments of the invention, the real-time data 220 can be provided by a user of the computer systems 202 and/or 204.

The prediction module 208 can be configured to receive both the real-time data 220 as well as historical data (e.g., previous actual/real data) from the real-time data history 228. In some embodiments of the invention, the prediction module 208 is configured to make predictions based on the real-time data 220 and the real-time data history 228. In some embodiments of the invention, the predictions can be stored in the memory 218 and/or in a prediction database 230.

In some embodiments of the invention, the prediction module 208 is implemented as one or more neural network(s) which can be trained on historical data (e.g., real-time data history 228) to generate weights for one or more internal (hidden) layers of the neural network. The trained neural network can then be used to make a prediction based on a current data feed (i.e., apply the real-time data 220 to the trained neural network to predict a next data point). The neural network could be implemented, for example, as a Long Short-Term Memory network (LSTM), although other neural networks such as deep neural networks (DNNs) and recurrent neural networks (RNNs) are within the contemplated scope of the disclosure.

LSTM networks are a type of artificial recurrent neural network (RNN) architecture used in the field of deep learning. Unlike standard feedforward neural networks, LSTM makes use of feedback connections. Advantageously, LSTM networks can not only process single data points (such as images), but also entire sequences of data (such as speech or video). For example, LSTM networks are applicable to tasks such as unsegmented, connected handwriting recognition, speech recognition, and anomaly detection in network traffic or IDSs (intrusion detection systems). Accordingly, LSTM networks are well-suited to classifying, processing and making predictions based on time series data (real-time data feeds), since there can be lags of unknown duration between important events in the time series.

Figure 4:
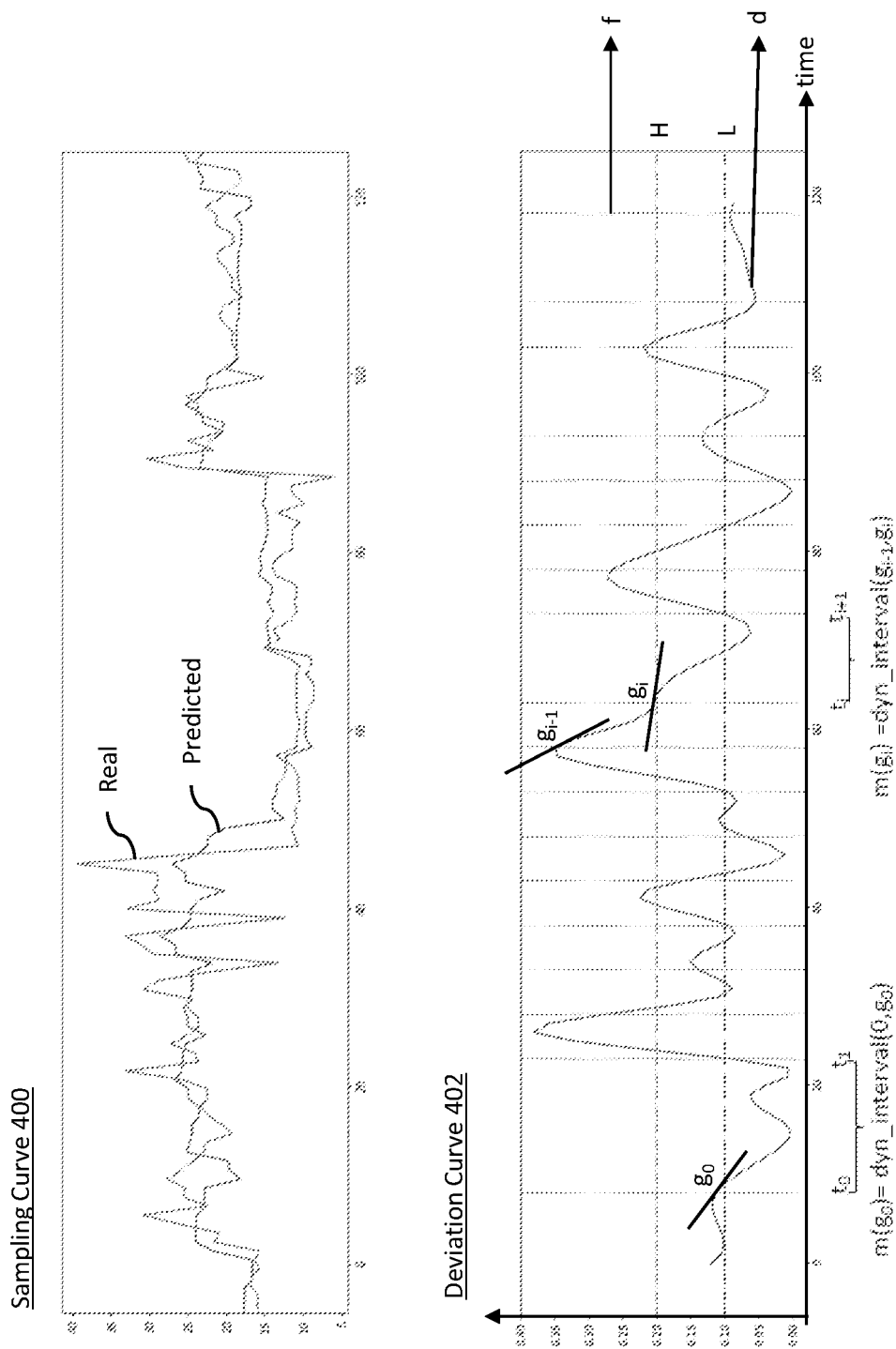
FIG. 4 illustrates an example sampling curve and deviation curve formed in accordance with one or more embodiments of the present invention.

In some embodiments of the invention, one or more predictions ($P_1, P_2, \ldots, P_N$) associated with various times ($t_1, t_2, \ldots, t_N$) stored in the prediction database 230 predictions and one or more known real data points ($R_1, R_2, \ldots, R_N$) at the corresponding times "$t_i$" can be plot together to define a sampling curve, such as the example Sampling Curve 400 illustrated in FIG. 4.

In some embodiments of the invention, the sampling module 210 is configured to continuously or periodically calculate a deviation value ($D_i$) for each prediction ($P_i$) based on the known real data ($R_i$) at the time corresponding to each prediction. In some embodiments of the invention, the deviation values ($D_i$) are taken as the error between the prediction ($P_i$) and the known real data ($R_i$) according to the error formula: $(R_i-P_i)/R_i$, although it is understood that any other suitable deviation measure can be used (absolute difference, percent difference, etc.). In some embodiments of the invention, the deviation values ($D_i$) are plot over time to define a deviation curve, such as the Deviation Curve 402 illustrated in FIG. 4 and corresponding to the Sampling Curve 400 discussed previously.

Continuing with the prior example, in some embodiments of the invention, there are more than one "data sets" against which a deviation score is calculated. In those scenarios, an overall aggregate deviation score "d" can be calculated at each time "t" for the Deviation Curve 402 by the formula $d=(|(R_1-P_1)/R_1|+|(R_2-P_2)/R_2|+\ldots+|(R_k-P_k)/R_k|)/k$ for "k" data samples at time "$t_0 \ldots t_N$", where each data sample can be a separate metric that is sampled for deviations (e.g., CPU usage, memory usage, Input/Output (I/O) load, network load, etc.). Table 1 illustrates individual deviation calculations for a system having four data sets: (1) CPU, (2) Memory, (3) I/O, and (4) Network. It should be understood that the actual number of data sets for a given application can be arbitrary.

TABLE 1

System Deviations for Four Data Sets

| CPU | $t_0$ | $t_1$ | $t_2$ | ... |
|---|---|---|---|---|
| $R_1$ | 0.76 | 1.23 | 12.20 | ... |
| $P_1$ | 0.69 | 1.35 | 10.8 | ... |
| $d_1$ | 9.21% | 13.24% | 11.47% | ... |
| Memory | $t_0$ | $t_1$ | $t_2$ | ... |
| $R_2$ | 256 | 134 | 23 | ... |
| $P_2$ | 247 | 141 | 26 | ... |
| $d_2$ | 3.51% | 5.22% | 13.04% | ... |
| I/O | $t_0$ | $t_1$ | $t_2$ | ... |
| $R_3$ | 1235 | 178 | 3389 | ... |
| $P_3$ | 1168 | 189 | 3120 | ... |
| $d_3$ | 5.42% | 6.18% | 7.93% | ... |
| Network | $t_0$ | $t_1$ | $t_2$ | ... |
| $R_4$ | 230 | 312 | 157 | ... |
| $P_4$ | 213 | 334 | 170 | ... |
| $d_4$ | 7.39% | 7.05% | 8.28% | ... |

Table 2 illustrates an overall system deviation for the system described in Table 1. The "judgment" parameter will be discussed later with respect to the compare module 212.

TABLE 2

Aggregate System Deviation

|  | $t_0$ | $t_1$ | $t_2$ | ... |
|---|---|---|---|---|
| d | 6.38% | 7.92% | 10.18% | ... |
| Judgment | Accept | Recheck | Deny | ... |

In some embodiments of the invention, the sampling module 210 is configured to sample the deviation values ($D_i$) at one or more times "$t_0 \ldots t_N$". In some embodiments of the invention, the sampling frequency (time between samples) can be predetermined (e.g., every 5 seconds, 10 minutes, hour, etc.). In some embodiments of the invention, the sampling frequency can be dynamically calculated. For example, timestamp $t_{i+1}$ for a next sample can occur at timestamp $t_i$+a dynamic interval $m(g_i)$, resulting in the sampling interval formula:

$$f_{i+1}=\text{sample}(t_i+m(g_i))$$

where $t_i$ is the last sampling timestamp, $g_i$ is the last sampling point gradient, and $m(g_i)$ is the sampling interval function defined as $m(g_i)=\text{dyn\_interval}(g_{i-1}, g_i)$ where "g" is the gradient of the deviation curve calculated at the time $t_i$.

In some embodiments of the invention, the dynamic interval function increases (increasing sampling frequency) as the gradient increases. Likewise, the sampling frequency can decrease when the gradient decreases. The degree (gain) to which the sample frequency changes as a function of the gradient can be arbitrarily defined depending on the needs of a particular application. Moreover, the change in sampling can be rough (predefined steps) or smooth (arbitrary steps) based on the slope of the gradient.

The Deviation Curve 402 illustrated in FIG. 4 provides example dynamic sampling points taken along the sampling lines "f" along the curve "d" and their associated calculated gradients at times $t_0$, $t_1$, $t_i$, $t_{i+1}$, etc. As shown in FIG. 4, the sampling rate increased (the dynamic interval decreased) during the interval $t_i$, $t_{i+1}$ due to the relatively high gradient $g_{i-1}$ at time $t_{i-1}$. It should be understood that the exact gradient slope required for a given change in sampling frequency can be arbitrarily defined. In some embodiments of the invention, the dynamic interval function itself is predefined. For example, each 5% increase in the gradient can result in a 5% (or 10%, etc.) increase in sample frequency, although a linear function is merely used for illustration and non-linear functions are also within the scope of the invention.

Figure 5:
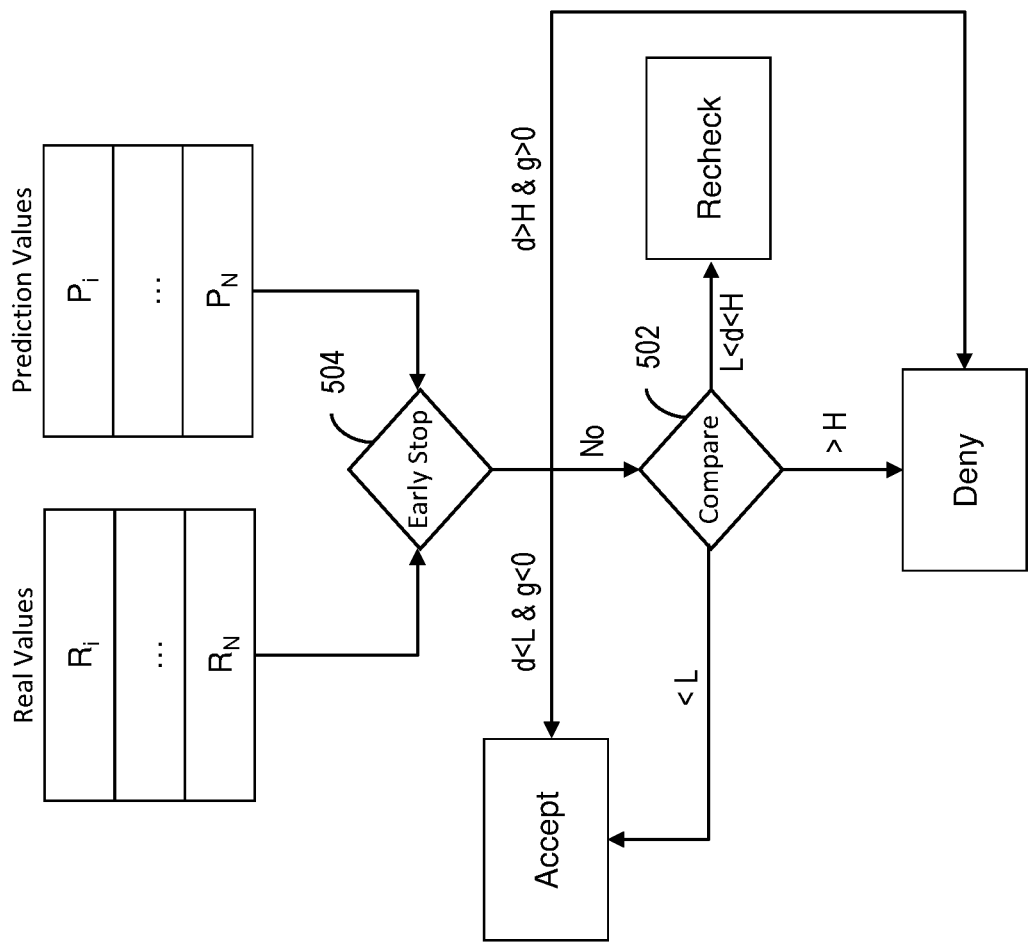
FIG. 5 illustrates an example compare module in accordance with one or more embodiments of the present invention.

In some embodiments of the invention, the Deviation Curve 402, the gradient data ($g_1 \ldots g_N$), and/or the deviation data ($d_1 \ldots d_N$) are passed to the compare module 212 so that a judgment result 226 (accept, recheck, deny) can be made for one or more predictions ($P_i$). FIG. 5 illustrates an example configuration for the compare module 212.

As shown in FIG. 5, the compare module 212 can take as inputs a series of Real Values ($R_i \ldots R_N$) and Prediction Values ($P_i \ldots P_N$) and can make a judgment result 226 (Accept, Deny, Recheck) at a compare block 502 depending on the calculated deviation between the predicted data and the real data (i.e., the logic routing through the compare module 212). In some embodiments of the invention, a lower threshold "L" and an upper threshold "H" are predefined, and the judgment result 226 is based on a comparison of the deviation against L and H. FIG. 4 illustrates example "L" and "H" thresholds superimposed over the Deviation Curve 402.

As a simple example, a prediction value ($P_i$) can be Accepted if it is below "L", Denied if it is above "H", and flagged for Recheck if L<d<H. Other more complex arrangements are possible. For example, in some embodiments of the invention, gradient data ($g_i$) is leveraged in the judgment decision. When the gradient is large (relatively high slope) the judgment outcome can be altered depending on whether the gradient is positive (deviations are increasing rapidly) or negative (deviations are decreasing rapidly). In this scenario, for example, a deviation that is L<d<H (which would otherwise be flagged for Recheck) can be immediately Accepted when the gradient has a large negative slope indicating that deviations are rapidly decreasing. The degree to which the gradient must be sloped to trigger a judgment adjustment can be arbitrarily defined. In some embodiments of the invention, a revision metric is calculated based on the gradient and the deviation at each time step: Revise(t)=revise(d(t), $g_t$). The revision metric can evaluate to "true" or "false", indicating that the gradient is enough (e.g., sharply negative but just above the L threshold; sharply positive but just below the H threshold, etc.) to trigger a judgment adjustment. An example formula for judgments that leverage gradient data is provided below:

$$D(t, t+1, g)=[\text{Accept, Recheck, Deny}]$$

Continuing with this example, "Accept" can be selected if (1) d(t)<L & revise(t)=false or if (2) H>d(t)>L & revise(t)=true; "Recheck" can be selected if (1) L<d(t)<H & revise(t)=false or if (2) d(t)>H/d(t)<L & revise(t)=true; "Deny" can be selected if (1) d(t)>H & revise(t)=false or if (2) H>d(t)>L & revise(t)=true.

In some embodiments of the invention, the compare module 212 includes an early stop gate 504 (also referred to as a pre-check) that can be used to improve efficiency by avoiding a true real/predicted comparison at every time step. In other words, an Accept or Deny decision can be made prior to (and bypassing) the compare block 502 in some circumstances. In some embodiments of the invention, the early stop gate 504 is inserted prior to the compare module 212, or alternatively, precheck functionality can be incorporated within the compare module 212 (as illustrated in FIG. 5).

FIG. 5 illustrates some example "early stop" conditions for immediate Accept/Deny, although it should be understood that these are merely illustrative and that other early stop conditions are within the contemplated scope of the invention. In some embodiments of the invention, the real values and prediction values are passed to the early stop gate 504 gate and an Accept decision or Deny decision can be made prior to the compare block 502 when the immediately prior decision (judgment at time t−1) satisfies a precheck condition, such as, for example, d<L & g<0, or when d>H & g>0, respectively. In other words, when the gradient is negative (g<0) and d<L for a current prediction ($P_N$) an Accept can be signaled for a next prediction ($P_{N+1}$) without undergoing a rigorous check. Similarly, when the gradient is positive (g>0) and d>H, a Deny can be signaled for a next prediction. These conditions can make an intuitive sense, as in the example d>H & g>0 for a current prediction ($P_t$) the deviation is already greater than the high limit threshold and the gradient indicates that the deviations are getting more severe over time. In this scenario computation can be reduced (improving time latency and expense) by bypassing the rigorous check for the next prediction ($P_{t+1}$). When an early stop is not triggered (i.e., a precheck condition is not satisfied), the real values and prediction values are passed through the early stop gate 504 to the compare block 502.

Figure 6:
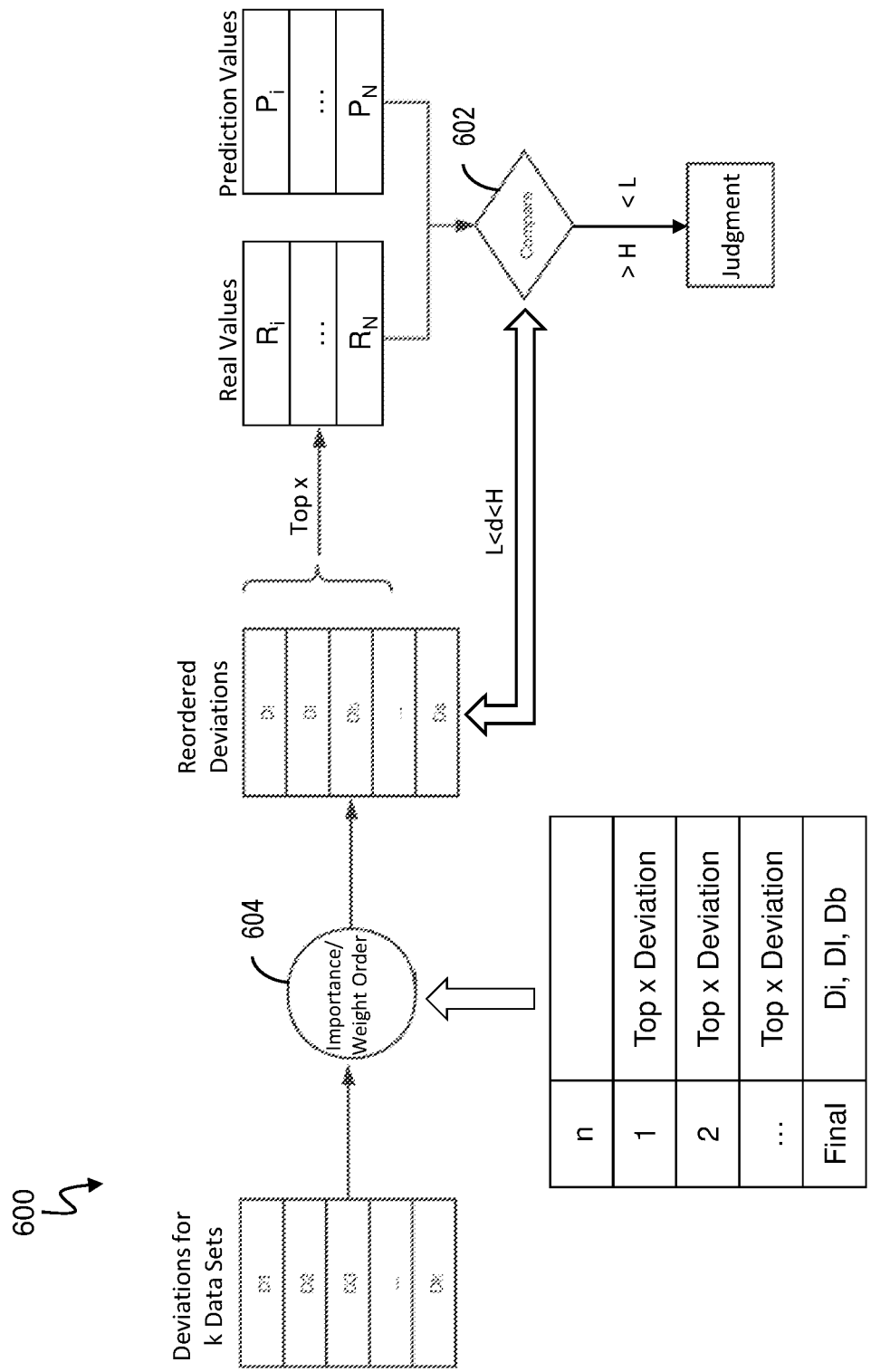
FIG. 6 illustrates an example compare pre-check module in accordance with one or more embodiments of the present invention.

In embodiments of the invention having multiple data sets "k" against which deviations are calculated, the compare module 212 can include further functionality, such as a precheck module 600 that orders the data sets in terms of importance prior to passing those real data-prediction data pairs to a compare block 602. FIG. 6 illustrates an example precheck module 600 that can be incorporated within or prior to the compare module 212 (FIG. 5), in a similar manner as the early stop gate 504.

As shown in FIG. 6, deviations $D_1, D_2, \ldots, D_k$ for k data sets can be reordered using an importance precheck 604 (also referred to as an importance-weighted order) into the list $D_i, D_j, D_h, \ldots, D_s$. In some embodiments of the invention, ordering of the k data sets can be by magnitude of the individual deviations ($d_i$) for each time step. For example, the deviations can be reordered such that the most deviant data set is first (most critical) and the least deviant data set is last (least critical). In some embodiments of the invention, only the real data-predicted data pairs for the top "x" deviations in terms of magnitude are passed to a compare block 602, reducing the computational load and time latency of the system. Each real-prediction pair ($R_i$-$P_i$) passed through to the compare block 602 is evaluated to determine whether the deviation d for the pair is >H, <L, or L<d<H. If a current real-prediction pair ($R_N$-$P_N$) for a dataset "N" is within the L and H thresholds, the next real-prediction pair ($R_{N+1}$-$P_{N+1}$) for the next dataset "N+1" is checked until a pair is found having a deviation >H or <L. Once found, the corresponding dataset (here, N+1) is deemed most critical for a next judgment, and the associated real-prediction pair is passed to the compare module 212 and/or the compare block 502 (FIG. 5). This process of selectively making judgments on only the most critical data sets (which dynamically change over time depending on each data set's deviation value at each time step) or only the "x" most critical data sets can continue indefinitely and the number of "x" data sets chosen for judgments can be adjusted based on the computational availably or time latency constraints of a given application. For example, in applications having strict time latency constraints (judgments must be made as quickly as possible) the number "x" can be lowered. In some embodiments of the invention, the value of "x" can be dynamically adjusted, such as, for example, lowered when the system cannot achieve predetermined time latency constraints at the current value for "x". In this manner a tradeoff can be made between computational rigor and platform-specific timing requirements.

Figure 7:
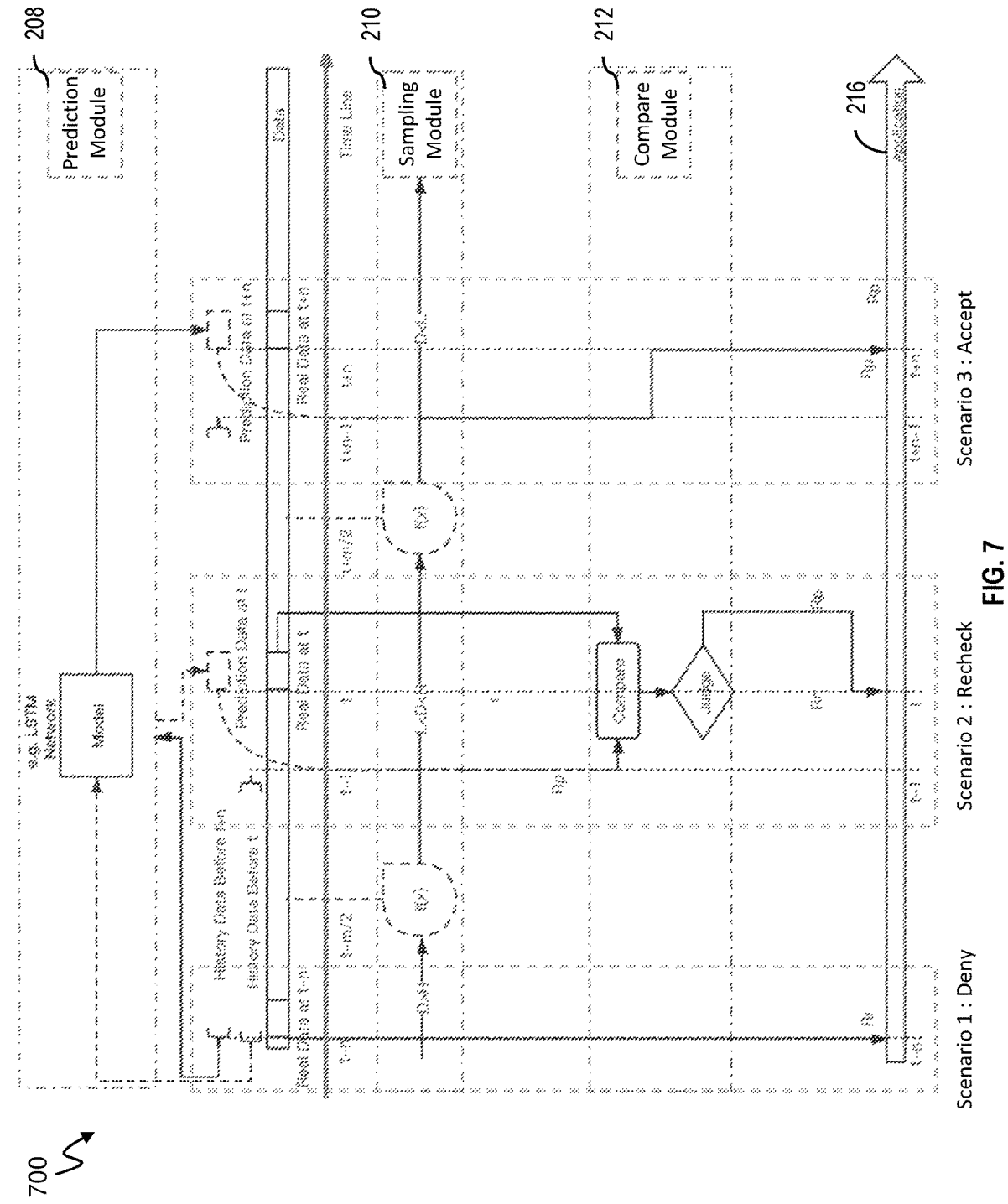
FIG. 7 illustrates an example workflow for evaluating model acceptability in accordance with one or more embodiments of the present invention.

FIG. 7 illustrates an example workflow 700 for evaluating model acceptability in accordance with one or more embodiments. As shown in FIG. 7, a system for evaluating model acceptability can include the prediction module 208, the sampling module 210, and the compare module 212 discussed previously. FIG. 7 further illustrates the data flows over time when evaluating model acceptability. In particular, judgments at times t−n, t−1, t, t+n−1, and t+n are provided for scenarios Deny, Recheck, and Accept. In FIG. 7, "m" is the sampling interval, "n" is the prediction interval, "f(x)" is the sampling function, "D" is the deviation, "L" is the Low deviation threshold, "H" is the High deviation threshold, "$R_p$" is the prediction data result, and "$R_r$" is the real data result.

As further shown in FIG. 7, the judgments can be passed, successively over time, to the user application 216. In some embodiments of the invention, the user application 216 is configured to generate an output (e.g., judgment result 226) that can be provided (e.g., displayed) on a user interface, for example via the displayer adaptor 115 depicted in FIG. 1. In this manner, the dynamic evaluation of the acceptability of a model over time can be visually inspected by a user.

Figure 8:
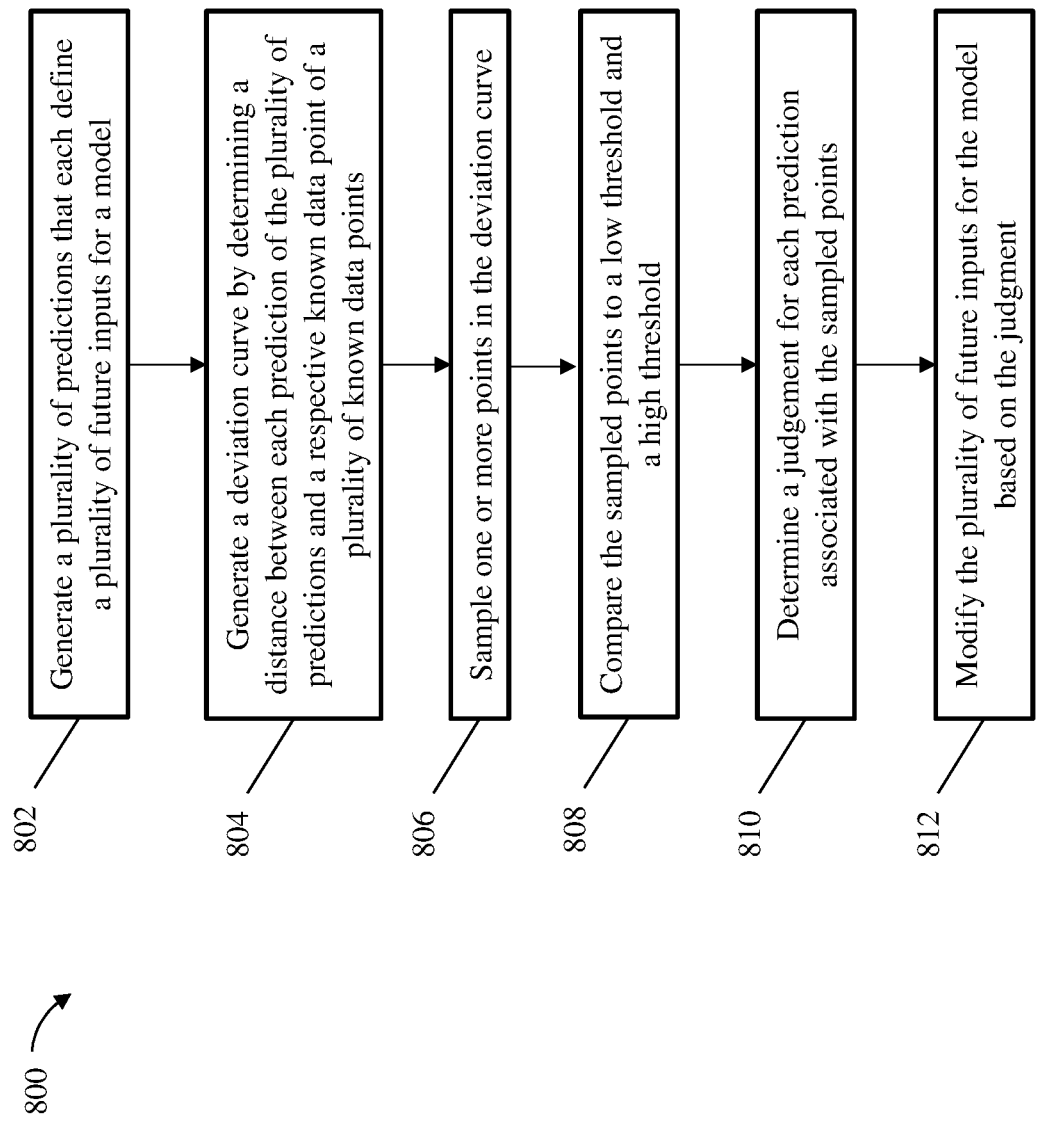
FIG. 8 is a flowchart for shape-based code comparisons in accordance with one or more embodiments of the present invention.

Referring now to FIG. 8, a flowchart 800 for providing dynamic evaluations of a model's acceptability is generally shown according to an embodiment. The flowchart 800 is described in reference to FIGS. 1-7 and may include additional steps not depicted in FIG. 8. Although depicted in a particular order, the blocks depicted in FIG. 8 can be rearranged, subdivided, and/or combined. At block 802, a plurality of predictions are generated. In some embodiments of the invention, each prediction is an estimated future input for a model. In some embodiments of the invention, each prediction is a prediction for a single future input.

At block 804, a deviation curve is generated. In some embodiments of the invention, the deviation curve is generated by determining a distance between each prediction of the plurality of predictions and a respective known data point of a plurality of known data points. In some embodiments of the invention, the known data points are received continuously in real-time.

At block 806, one or more points in the deviation curve are sampled. In some embodiments of the invention, each sampled point is defined as the distance between the associated prediction and the respective known data point. At block 808, the sampled points are compared to a low threshold and a high threshold.

At block 810, a judgement is made for each prediction associated with the sampled points. In some embodiments of the invention, each judgment is defined as a decision as to whether the respective prediction will be accepted or denied as an input to the model based on the comparison of the respective sampled point to the low threshold and the high threshold. At block 812, the plurality of future inputs for the model are modified based on the judgments.

The method can further include determining a sample point gradient in the deviation curve for each sampled point (see, e.g., FIG. 4). In some embodiments of the invention, the judgment for each prediction is based in part on the sample point gradient associated with the respective sample point. In some embodiments of the invention, a sampling rate for a next prediction is adjusted based at least in part on the sample point gradient associated with a current prediction. In some embodiments of the invention, a judgment for a next prediction is skipped based at least in part on the comparison of the respective sampled point to the low threshold and the high threshold and the sample point gradient associated with a current prediction (see, e.g., FIG. 5).

In some embodiments of the invention, the plurality of predictions is associated with two or more data sets. In some embodiments of the invention, each point in the deviation curve represents a combination of deviation values, each deviation value associated with one of the two or more data sets (see, e.g., FIG. 6 and Tables 1 and 2).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
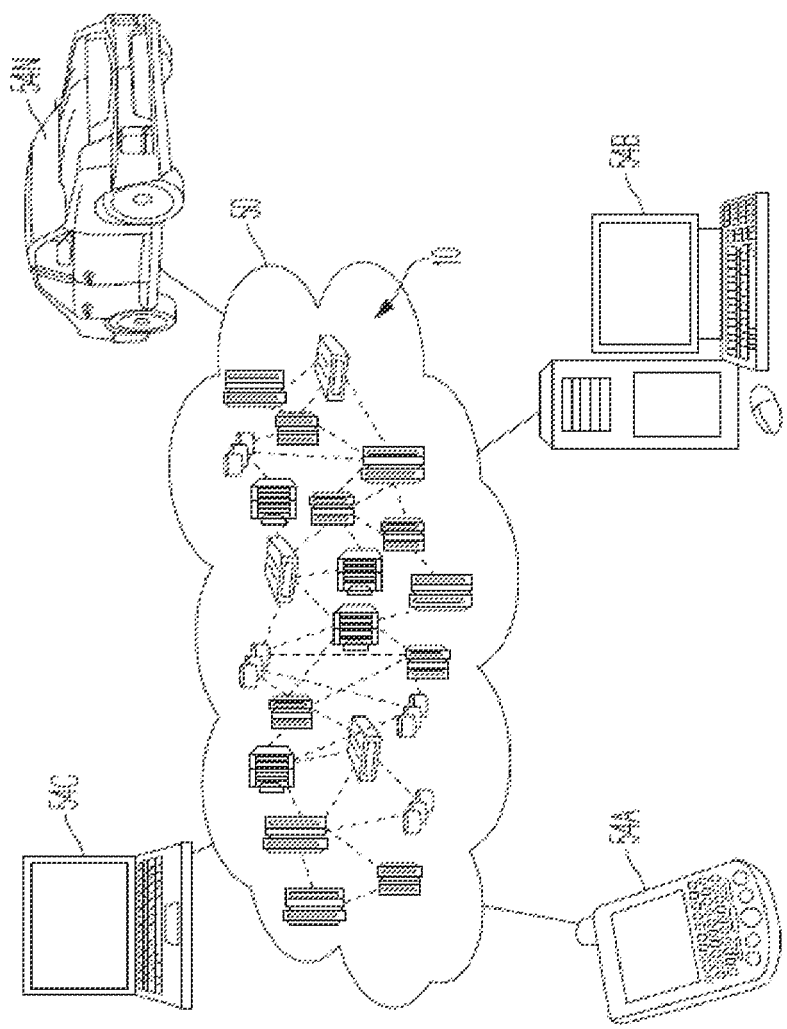
FIG. 9 depicts a cloud computing environment according to one or more embodiments of the present invention.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
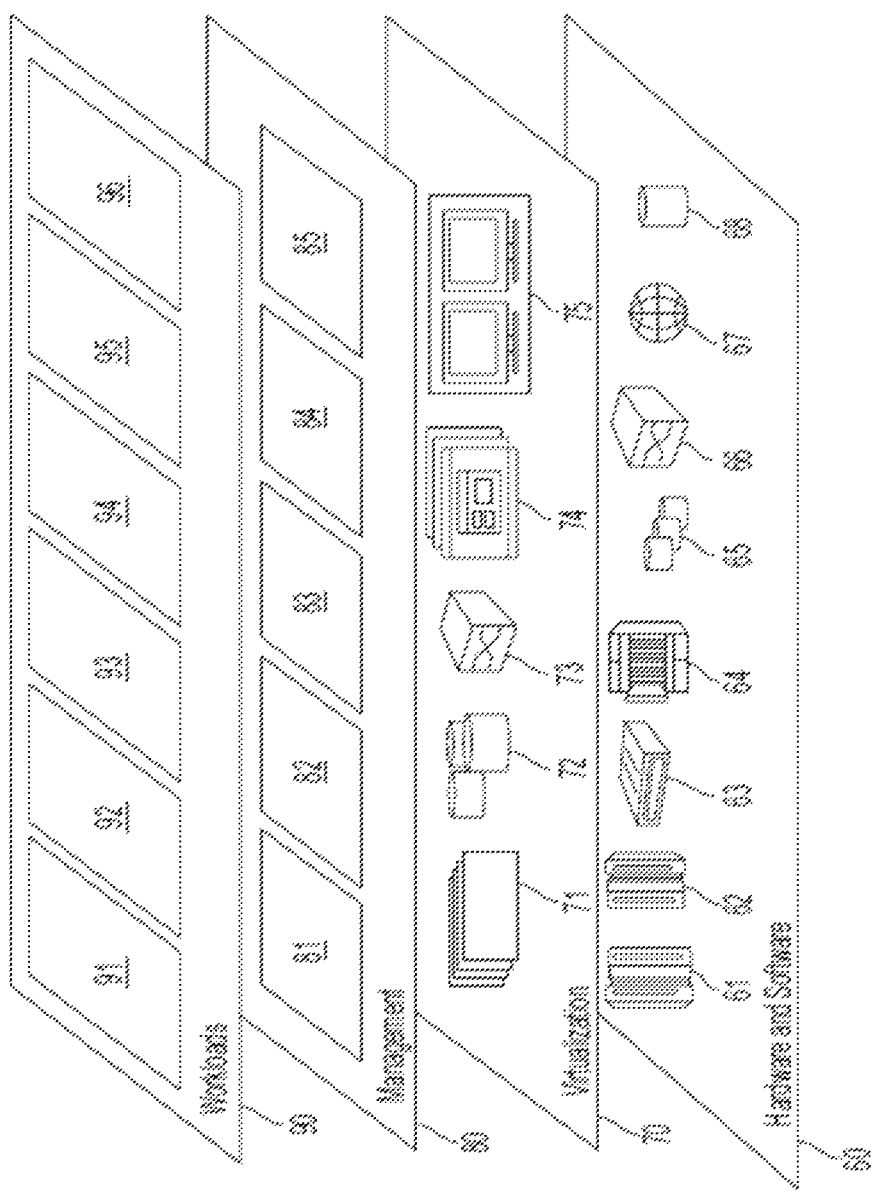
FIG. 10 depicts abstraction model layers according to one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    training a neural network to predict a value of real-time data prior to the real-time data being available;
    generating, with the trained neural network and responsive to receiving current real-time data, a plurality of predictions, wherein each prediction is a prediction for a future real-time input to a model;
    collecting, after generating the plurality of predictions, actual values for the future real-time inputs to the model;
    generating a deviation curve encoding, in real-time, a distance between each prediction of a future real-time input to the model and the respective collected actual value for the future real-time input to the model;
    sampling one or more points in the deviation curve, wherein each sampled point comprises the distance between the associated prediction and the respective collected actual value for the future real-time input;
    determining a sample point gradient in the deviation curve for each sampled point;
    passing the sampled points and the respective sample point gradients to a compare module, the compare module configured for:
        comparing the sampled points to a low threshold and a high threshold; and
        at each time step, accepting or denying the respective prediction as an input to the model based on the comparison of the respective sampled point to the low threshold and the high threshold and a value of the respective sample point gradient, and wherein the decision associated with a respective sampled point is overridden responsive to a value of the respective sample point gradient being above a predetermined threshold; and
    modifying the plurality of future inputs for the model by selectively replacing a subset of the predictions with their corresponding collected actual values for the future real-time inputs according to the acceptance or denial at each time step.

2. The computer-implemented method of claim 1, wherein a sampling rate for a next prediction is adjusted based at least in part on the sample point gradient associated with a current prediction.

3. The computer-implemented method of claim 1, wherein a judgment for a next prediction is skipped based at least in part on the comparison of the respective sampled point to the low threshold and the high threshold and the sample point gradient associated with a current prediction.

4. The computer-implemented method of claim 1, wherein the plurality of predictions is associated with two or more data sets, and wherein each point in the deviation curve represents a combination of deviation values, each deviation value associated with one of the two or more data sets.

5. A system comprising:
    a memory having computer readable instructions; and
    one or more processors for executing the computer readable instructions, the computer readable instructions controlling the one or more processors to perform operations comprising:
        training a neural network to predict a value of real-time data prior to the real-time data being available;
        generating, with the trained neural network and responsive to receiving current real-time data, a plurality of predictions, wherein each prediction is a prediction for a future real-time input to a model;
        collecting, after generating the plurality of predictions, actual values for the future real-time inputs to the model;
        generating a deviation curve by encoding, in real-time, a distance between each prediction of a future real-time input to the model and the respective collected actual value for the future real-time input to the model;
        sampling one or more points in the deviation curve, wherein each sampled point comprises the distance between the associated prediction and the respective collected actual value for the future real-time input;
        determining a sample point gradient in the deviation curve for each sampled point;
    passing the sampled points and the respective sample point gradients to a compare module, the compare module configured for:
        comparing the sampled points to a low threshold and a high threshold; and at each time step, accepting or denying the respective prediction as an input to the model based on the comparison of the respective sampled point to the low threshold and the high threshold and a value of the respective sample point gradient, and wherein the decision associated with a respective sampled point is overridden responsive to a value of the respective sample point gradient being above a predetermined threshold; and modifying the plurality of future inputs for the model by selectively replacing a subset of the predictions with their corresponding collected actual values for the future real-time inputs according to the acceptance or denial at each time step.

6. The system of claim 5, wherein a sampling rate for a next prediction is adjusted based at least in part on the sample point gradient associated with a current prediction.

7. The system of claim 5, wherein a judgment for a next prediction is skipped based at least in part on the comparison of the respective sampled point to the low threshold and the high threshold and the sample point gradient associated with a current prediction.

8. The system of claim 5, wherein the plurality of predictions is associated with two or more data sets, and wherein each point in the deviation curve represents a combination of deviation values, each deviation value associated with one of the two or more data sets.

9. A computer program product comprising a computer readable storage medium having program instructions embodied therewith, the program instructions executable by a processor to cause the processor to perform operations comprising:

training a neural network to predict a value of real-time data prior to the real-time data being available;

generating, with the trained neural network and responsive to receiving current real-time data, a plurality of predictions, wherein each prediction is a prediction for a future real-time input to a model;

collecting, after generating the plurality of predictions, actual values for the future real-time inputs to the model;

generating a deviation curve encoding, in real-time, a distance between each prediction of a future real-time input to the model and the respective collected actual value for the future real-time input to the model;

sampling one or more points in the deviation curve, wherein each sampled point comprises the distance between the associated prediction and the respective collected actual value for the future real-time input;

determining a sample point gradient in the deviation curve for each sampled point;

passing the sampled points and the respective sample point gradients to a compare module, the compare module configured for:

comparing the sampled points to a low threshold and a high threshold;

and at each time step, accepting or denying the respective prediction as an input to the model based on the comparison of the respective sampled point to the low threshold and the high threshold and a value of the respective sample point gradient, and wherein the decision associated with a respective sampled point is overridden responsive to a value of the respective sample point gradient being above a predetermined threshold; and modifying the plurality of future inputs for the model by selectively replacing a subset of the predictions with their corresponding collected actual values for the future real-time inputs according to the acceptance or denial at each time step.

10. The computer program product of claim 9, wherein a sampling rate for a next prediction is adjusted based at least in part on the sample point gradient associated with a current prediction.

11. The computer program product of claim 9, wherein a judgment for a next prediction is skipped based at least in part on the comparison of the respective sampled point to the low threshold and the high threshold and the sample point gradient associated with a current prediction.

12. The computer program product of claim 9, wherein the plurality of predictions is associated with two or more data sets, and wherein each point in the deviation curve represents a combination of deviation values, each deviation value associated with one of the two or more data sets.

* * * * *